(12) United States Patent
Zischka (10) Patent No.: US 11,858,447 B2
(45) Date of Patent: Jan. 2, 2024

(54) PASSENGER RESTRAINT SYSTEM HAVING A SEAT AND VEHICLE COMPRISING A PASSENGER RESTRAINT SYSTEM

(71) Applicant: ZF AUTOMOTIVE GERMANY GMBH, Alfdorf (DE)

(72) Inventor: Gerd Zischka, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 7 days.

(21) Appl. No.: 17/639,607

(22) PCT Filed: Sep. 1, 2020

(86) PCT No.: PCT/EP2020/074277
§ 371 (c)(1),
(2) Date: Mar. 2, 2022

(87) PCT Pub. No.: WO2021/043735
PCT Pub. Date: Mar. 11, 2021

(65) Prior Publication Data
US 2022/0332269 A1    Oct. 20, 2022

(30) Foreign Application Priority Data
Sep. 4, 2019  (DE) ............ 10 2019 123 622.3

(51) Int. Cl.
*B60R 21/207*  (2006.01)
*B60R 21/2338*  (2011.01)
*B60R 21/231*  (2011.01)

(52) U.S. Cl.
CPC ........ *B60R 21/207* (2013.01); *B60R 21/2338* (2013.01); *B60R 2021/23146* (2013.01); *B60R 2021/23384* (2013.01)

(58) Field of Classification Search
CPC ........ B60R 21/207; B60R 2021/23146; B60R 21/2338
See application file for complete search history.

(56) References Cited

U.S. PATENT DOCUMENTS 9,834,165 B2 *  12/2017  Rao ................ B60R 21/04
10,252,693 B2 *  4/2019  Numazawa ........ B60R 21/207
(Continued)

FOREIGN PATENT DOCUMENTS

DE   102007013543 A1   9/2008
DE   102015207882 A1   11/2016
(Continued)

OTHER PUBLICATIONS

PCT Search Report for corresponding International Application Serial No. PCT/EP2020/074277, dated Oct. 26, 2020, pp. 1-5.

*Primary Examiner* — Faye M Fleming
(74) *Attorney, Agent, or Firm* — TAROLLI, SUNDHEIM, COVELL & TUMMINO L.L.P.

(57) ABSTRACT

An occupant restraint system (30) comprises a seat (14), at least one airbag integrated in the seat (14) and an airbag control device. The seat (14) is adjustable at least between a first seating position and a second seating position, the seat (14) in the second seating position having an orientation (A) that is rotated vis-à-vis the first seating position about an angle of rotation (α) from 170° to 190°. The airbag has a first inflated state and a second inflated state in which the airbag has an external geometry different from the one in the first inflated state. Accordingly, the airbag control device is arranged so that, in the case of need, the airbag adopts the first inflated state when the seat (14) is in the first seating position, and the airbag adopts the second inflated state when the seat (14) is in the second seating position. Further, a vehicle (10) comprising such an occupant restraint system (30) is provided.

18 Claims, 3 Drawing Sheets

(56) References Cited

U.S. PATENT DOCUMENTS

| | | | |
|---|---|---|---|
| 10,821,928 B2 * | 11/2020 | Deng | B60R 21/23138 |
| 11,161,473 B2 * | 11/2021 | Deng | B60R 21/233 |
| 11,180,102 B1 * | 11/2021 | Jaradi | B60R 21/2338 |
| 11,560,112 B2 * | 1/2023 | Ohno | B60R 21/0136 |
| 11,618,404 B1 * | 4/2023 | Jaradi | B60R 21/23138 |
| | | | 280/730.1 |
| 2016/0272141 A1 * | 9/2016 | Ohmura | G01C 21/34 |
| 2017/0247006 A1 | 8/2017 | Rao et al. | |
| 2017/0267205 A1 | 9/2017 | Numazawa | |
| 2017/0297524 A1 | 10/2017 | Sugie et al. | |
| 2023/0054543 A1 * | 2/2023 | Kobayashi | B60R 21/23138 |

FOREIGN PATENT DOCUMENTS

| | | | |
|---|---|---|---|
| DE | 102017102757 A1 | 9/2017 | |
| DE | 102017111566 A1 | 11/2017 | |
| DE | 102018002024 A1 | 9/2018 | |
| DE | 102019107365 A1 * | 9/2020 | B60R 21/01 |
| JP | H10324221 A | 12/1998 | |
| WO | 2018/167911 A1 | 9/2018 | |

\* cited by examiner

PASSENGER RESTRAINT SYSTEM HAVING A SEAT AND VEHICLE COMPRISING A PASSENGER RESTRAINT SYSTEM

RELATED APPLICATIONS

This application is a U.S. National Stage Application filed under 35 USC 371, claiming priority to Serial No. PCT/EP2020/074277, filed on 1 Sep. 2020; which claims priority from German Patent Application DE 10 2019 123 622.3, filed 4 Sep. 2019, the entireties of which are hereby incorporated herein by reference.

TECHNICAL FIELD

The invention relates to an occupant restraint system comprising an adjustable seat and at least one airbag integrated in the seat. The invention further relates to a vehicle comprising such occupant restraint system.

BACKGROUND

Occupant restraint systems comprising an airbag are well-known and are typically used in automotive vehicles to cushion or support a vehicle occupant in the case of restraint such as in the event of crash, thereby reducing the risk of injury and, thus, increasing the safety of the vehicle occupant.

In the future, the requirements to the flexibility of restraint devices will increase as, with an increasingly wide-spread use of autonomous driving, a seating position adopted by the vehicle occupants may vary by far more strongly depending on the driving situation than it is currently the case.

SUMMARY

Therefore, it is an object of the present invention to provide an occupant restraint system that can provide an improved protective effect.

For achieving the object, an occupant restraint system for a vehicle comprising a seat, at least one airbag integrated in the seat and an airbag control device is provided. The seat is adjustable at least between a first seating position and a second seating position, wherein, in the second seating position, the seat has an orientation that is rotated about an angle of rotation from 170° to 190° vis-à-vis the first seating position. The airbag has a first inflated state and a second inflated state in which the airbag has an external geometry different from that in the first inflated state. The airbag control device is arranged so that, in the case of need or case of restraint, i.e., when the airbag is released to provide its protective or restraining effect, the airbag adopts the first inflated state when the seat is in the first seating position, and the airbag adopts the second inflated state when the seat is in the second seating position.

This configuration helps couple the state of the airbag to the seating position, specifically to the orientation of the seat in the vehicle so that, in the case of restraint such as during crash, the airbag provides a protective effect adapted to the seating position. This is of advantage in particular because the seat environment inside the vehicle usually is not symmetrical so that, when the orientation of the seat varies, also the closed and open areas will vary in the space of deployment into which the airbag deploys and inflates in the case of restraint. Thus, the airbag can be set, in response to the seating position, so that its inflated state is adapted to the corresponding space of deployment. In this way, the protective effect provided by the restraint system and, thus, the safety specifically of the vehicle occupant who is seated in the seat and whose orientation inside the vehicle depends on the respective orientation of the seat can be increased.

Within the scope of this disclosure, the inflated state is particularly the state of the airbag after activation of the airbag in the case of restraint in which the airbag is completely inflated. If the airbag can adopt different volumes, e.g., due to a tether, the inflated state is the respective completely inflated state for such a volume.

In particular, the seat can be oriented in the first seating position in the direction of travel intended as primary traveling direction for the vehicle, i.e., the vehicle occupant seated in the seat travels forward and looks in the direction of travel.

In the second seating position, the seat is oriented in this case opposite to the direction of travel, i.e., the vehicle occupant seated in the seat travels rearward and looks against the direction of travel.

In one configuration of the invention, the first inflated state and the second inflated state differ from each other by different geometry, volume, orientation and/or internal pressure of the airbag, in particular the volume of the airbag in the second inflated state being larger than in the first inflated state. In this way, different protective effects can be achieved.

For example, the orientation of the airbag in the inflated state is determined relative to the backrest or the anchoring point on the backrest.

In particular, in accordance with the invention, a different internal pressure of the airbag results in a different external geometry of the airbag, even if all other parameters remain constant.

In one embodiment, the seat in the second seating position has an orientation that is rotated about an angle of rotation of 180° relative to the first seating position.

Particularly, the seat in the first seating position is oriented in the direction of travel and in the second seating position is oriented against the direction of travel.

As the seat is oriented exactly in or against the direction of travel, particularly high safety can be ensured for the vehicle occupant sitting in the seat, because in this orientation the loads upon the vehicle occupant in a case of restraint can be kept particularly low, especially compared to an orientation transversely to the direction of travel.

For example, the airbag is a seat-integrated side airbag so that the vehicle occupant can be laterally supported. Side airbags are airbags which are arranged laterally, in particular perpendicularly, to the seating direction and/or direction of travel relative to the vehicle occupant.

In another embodiment, the seat comprises a second airbag. The second airbag also has a first inflated state and a second inflated state in which the second airbag has an external geometry different from that in the first inflated state. Accordingly, the airbag control device is arranged so that, in the case of need, the second airbag adopts the second inflated state when the seat is in the first seating position, and that the second airbag adopts the first inflated state when the seat is in the second seating position. The fact that the seat includes two airbags allows each of the two airbags to provide a protective effect in a different area, thereby allowing the safety to be increased. In addition, the protective effect provided by the airbags can be further increased by adapting the different inflated states of each airbag to the seating position.

The first airbag and the second airbag can be intended to be seat-integrated side airbags which are provided in lateral regions of the seat opposite to each other, in particular in the side bolsters of the seat. In this way, the restraint system can protect and restrain the vehicle occupant sitting in the seat toward both sides by means of the airbags.

In this case, the occupant restraint system can be arranged so that, in the first seating position, the first airbag provides a first protecting effect and the second airbag provides a second protective effect, and that, in the second seating position, the first airbag provides the second protective effect and the second airbag provides the first protective effect. This means that the airbags adopt the function of the respective other airbag. In other words, the protective effect provided is coupled to the position of the respective airbag in the vehicle rather than to the airbag itself. Thus, the vehicle occupant sitting in the seat can be protected optimally in both seating positions by the restraint system.

In particular, the first and second airbags are symmetrical, both in the first inflated state and in the second inflated state, to a vertical plane extending centrally relative to the seat. That is, the airbags have mirror-inverted geometries. Consequently, the airbags are not only capable of adopting the function of the other airbag but also show the geometry thereof so that an identical protective effect can be reliably ensured.

According to one embodiment, the seat comprises a third airbag and a fourth airbag. Each of the third and fourth airbags has a first inflated state and a second inflated state in which they have different external geometries compared to the first inflated state. Accordingly, the airbag control device is arranged so that, in the case of need, the third airbag and the fourth airbag adopt the respective first or second inflated state when the seat is in the first seating position, and that the third and fourth airbags adopt the respective second or first inflated state when the seat is in the second seating position. By the third and fourth airbags having individual inflated states, a protective effect adapted to the seating position can be provided for the vehicle occupant sitting in the seat in further regions so that the safety is further increased.

Basically, each airbag of the seat may show individual first and second inflated states.

According to another embodiment, the third airbag and the fourth airbag are seat-integrated airbags. The first airbag and the third airbag are provided in a first lateral region of the seat, and the second airbag and the fourth airbag are provided in a lateral region of the seat opposite to the first lateral region, in particular in the side bolsters of the seat. Thus, the vehicle occupant sitting in the seat can be protected or restrained, in the case of restraint, toward both sides by means of two respective airbags.

For example, the airbags are superimposed in pairs. One airbag may be a head airbag and the other may be a thorax airbag. Preferably, the upper airbags are combined head-shoulder airbags and the lower airbags are combined thorax-pelvis airbags.

Moreover, the occupant restraint system can be arranged so that in the first seating position the third airbag provides a third protective effect and the fourth airbag provides a fourth protective effect, and that in the second seating position the third airbag provides the fourth protective effect and the fourth airbag provides the third protective effect. This means that the third airbag and the fourth airbag each take over the function of the other airbag. In other words, the protective effect provided by the third and fourth airbags is coupled to the respective position thereof inside the vehicle rather than to themselves. Thus, the vehicle occupant sitting in the seat can be protected optimally in both seating positions by the restraint system. The protective effect is determined, inter alia, by the volume, the external geometry and the position of the inflated airbag.

In particular, the third and fourth airbags are symmetrical, both in the first inflated state and in the second inflated state, to a vertical plane extending centrally relative to the seat. That is, the third and fourth airbags show mirror-inverted geometries. Consequently, the third and fourth airbags each cannot only take over the function of the other airbag but also have the geometry thereof so that an identical protective effect can be reliably ensured.

In order to reliably reach the desired inflated state, the airbag control device in one embodiment includes a release device for each airbag which is arranged to release the second inflated state of the respective airbag.

For this purpose, each airbag may include at least one tether which is permanently connected to a wall of the respective airbag, the tethers in the first inflated state being anchored to the release device of the respective airbag and in the second inflated state being detached from the release device of the respective airbag. Each of the release devices is arranged to selectively release the tether of the respective airbag. The first inflated state can be reliably shaped by means of the tethers.

The invention specifically provides the internal pressure of the airbag to be varied. This is achieved, for example, by a driven outlet valve. Via said outlet valve more or less gas can flow into the airbag or more or less gas can flow out of the airbag, depending on the arrangement of the outlet valve in the feed line toward the airbag or on the airbag itself.

In particular, different service lives for the airbags can be provided by said outlet valves. In this way, the airbag or airbags located close to the sidewall of the vehicle will require a shorter service life than the airbags facing the vehicle center so that the outlet valves for the airbags located toward the side window may be open, whereas the ones located toward the vehicle center are closed.

When at least two airbags are arranged on each side of the seat, according to the invention the respective upper airbag is intended to be in charge of the shoulder and head area and the respective lower airbag is intended to be in charge of the thorax and pelvis area.

In another embodiment, the seat includes an orientation sensor that is connected to the airbag control device for signal transmission and that is arranged to determine the orientation of the seat. In this way, the seating position of the seat can be reliably detected and, thus, the airbags can be ensured to inflate into the respective states in the case of restraint.

According to the invention, for achieving the afore-mentioned object also a vehicle comprising an occupant restraint system according to the invention offering the afore-mentioned advantages is provided.

BRIEF DESCRIPTION OF THE DRAWINGS

Further advantages and features result from the following description and from the attached drawings, wherein.

DESCRIPTION

Figure 1:
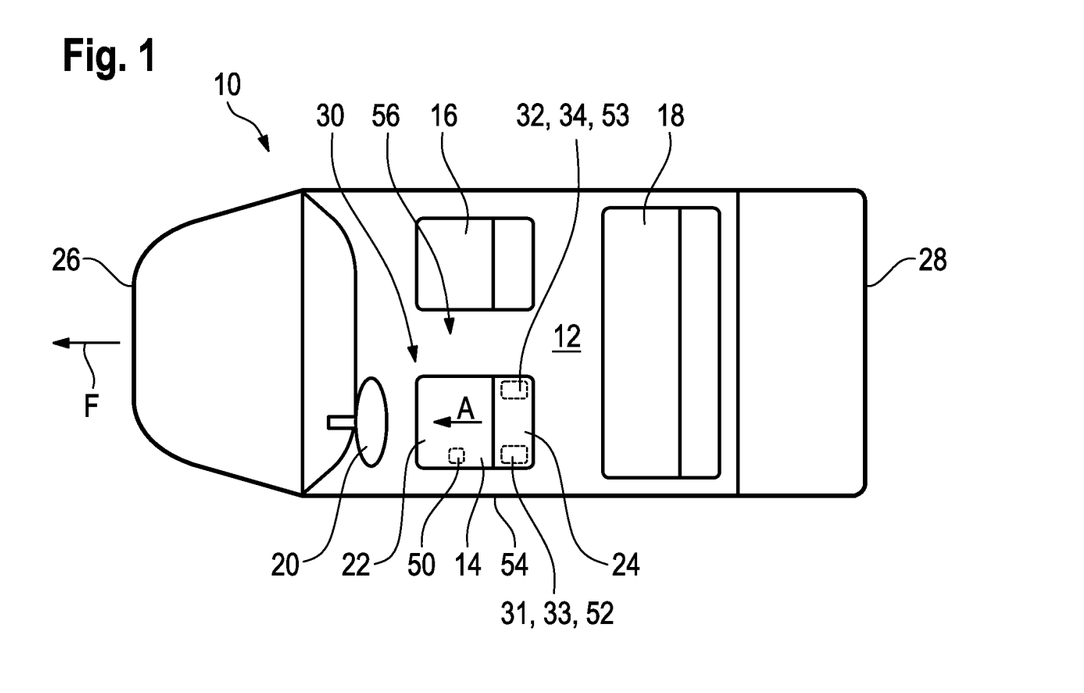
FIG. 1 schematically shows in a top view a vehicle according to the invention comprising an occupant restraint system according to the invention with a seat in a first seating position, FIG. 2 schematically shows in a top view the vehicle from FIG. 1 with the seat in a second seating position, FIG. 3 schematically shows in a perspective view the seat from FIG. 1 with four airbag modules, FIG. 4 schematically shows the seat from FIG. 1 in a rear view.
Figure 2:
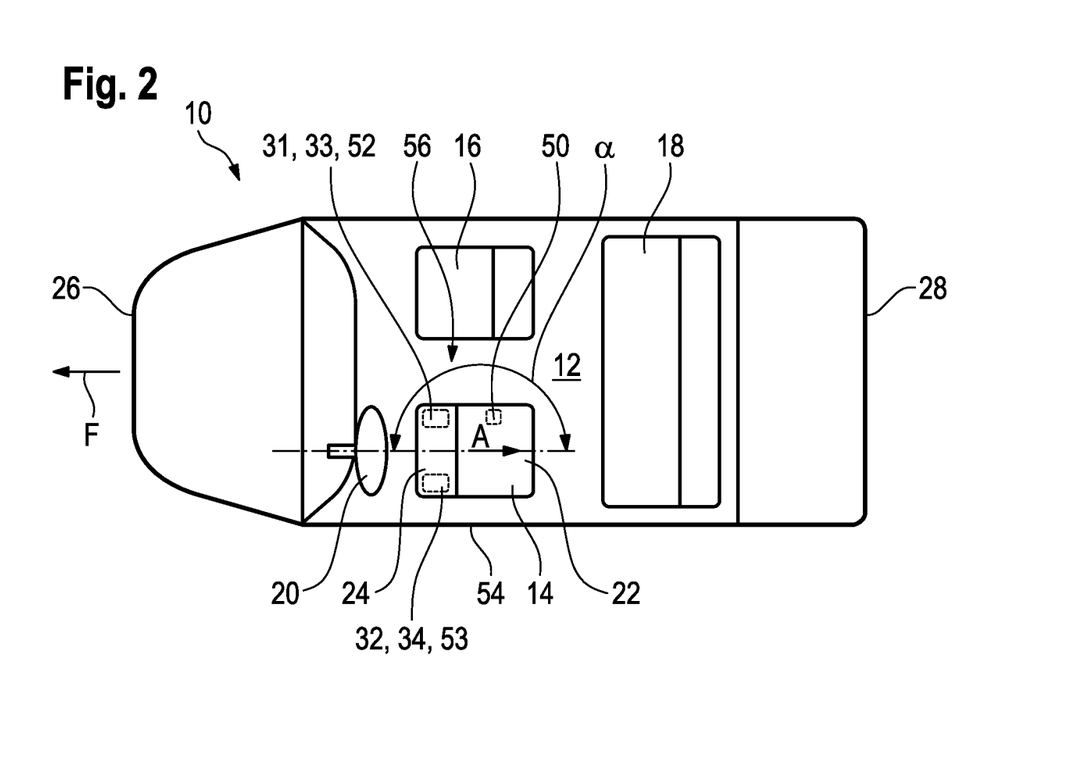

In FIGS. 1 and 2, a vehicle 10 comprising a vehicle interior 12 provided for passenger transport is shown.

For this purpose, the vehicle 10 in the vehicle interior 12 has a seat 14, a passenger seat 16 and a rear bench seat 18 in the rear passenger compartment.

The seat 14 is provided as a driver seat and is arranged facing a steering wheel 20 configured for steering the vehicle 10.

Basically, the vehicle 10 may include any number of seats with any arrangement in the vehicle interior 12.

The seat 14 has a seating surface 22 and a backrest 24 which define the orientation A of the seat 14 and a vehicle occupant sitting in the seat 14.

Further, the seat 14 is rotatable about an angle of rotation a between a first seating position (see FIG. 1) and a second seating position (see FIG. 2) so that the orientation A of the seat 14 in the vehicle interior 12 will correspondingly change.

In the shown embodiment, the axis of rotation is perpendicular to the plane of projection.

The vehicle 10 has a front end 26 and a rear end 28 as well as a primary direction of travel F directed from the rear end 28 to the front end 26.

In the shown embodiment, the seat 14 in the first seating position is oriented in the direction of travel F and in the second seating position is oriented against the direction of travel F, when the car drives autonomously, for example.

The angle of rotation a between the first seating position and the second seating position is 180°.

In an alternative embodiment, the angle of rotation a may have a value ranging from 170° to 190°.

As a matter of course, the seat 14 may have further seating positions, in particular intermediate positions between the first seating position and the second seating position.

In a preferred embodiment, the vehicle 10 is arranged for autonomous and/or piloted driving so that a driver is not permanently required for steering the vehicle 10.

In the present embodiment, this means in particular that the vehicle 10 can also be operated when the seat 14 is in the second seating position. In other words, the vehicle 10 is arranged so that, while the vehicle 10 is traveling, a vehicle occupant is seated in the seat 14 in the second seating position backwards to the direction of travel F.

Accordingly, the first seating position according to FIG. 1 is provided, if the vehicle occupant is steering the vehicle 10 himself/herself. The second seating position according to FIG. 2 is provided, if the vehicle occupant does not have to steer or monitor the vehicle 10, in particular if the vehicle 10 is driving autonomously.

In order to ensure high safety for the vehicle occupant in both seating positions, the seat 14 is part of an occupant restraint system 30 of the vehicle 10 which will be illustrated hereinafter based on FIGS. 3 to 6 and which serves for restraining a vehicle occupant who has taken a seat 14 in the case of restraint, i.e., usually in the event of crash.

Basically, in an alternative embodiment, any rotatable seat may be part of the occupant restraint system 30, specifically the passenger seat 16.

As a matter of course, in an alternative embodiment, the occupant restraint system 30 may comprise plural rotatable seats such as the seat 14 and the passenger seat 16.

The following explanations are applicable mutatis mutandis in these cases to each individual seat of the occupant restraint system 30.

Figure 3:
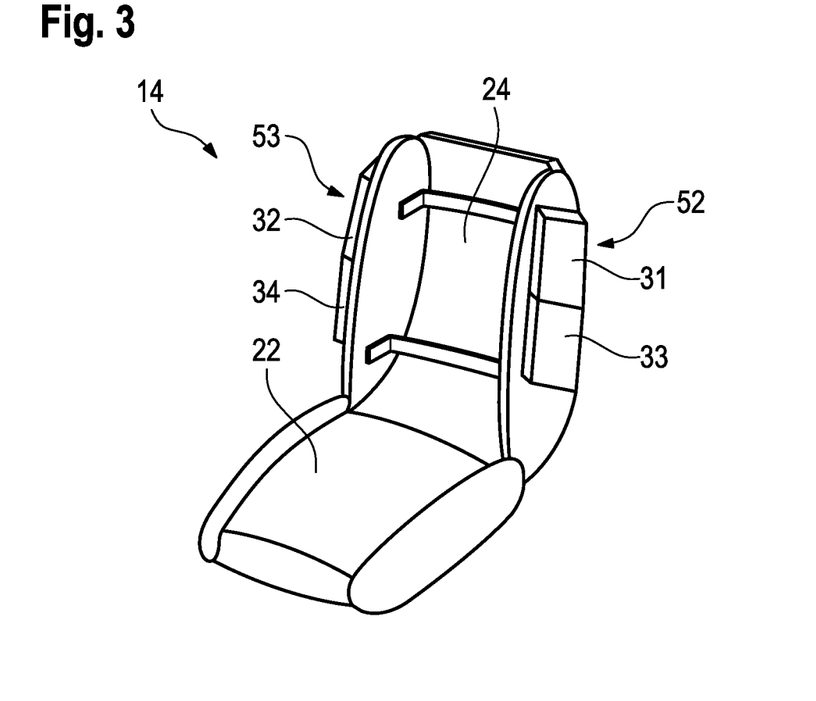

The occupant restraint system 30 comprises a first airbag module 31, a second airbag module 32, a third airbag module 33 and a fourth airbag module 34.

Each of the airbag modules 31, 32, 33, 34 has an airbag 36 (see FIG. 5) and an airbag control device 38 which includes a gas generator 40, a release device 42 and a control unit 44.

Of course, the gas generator 40, the release device 42 and the control unit 44 may also be designed separately from each other.

Figure 5:
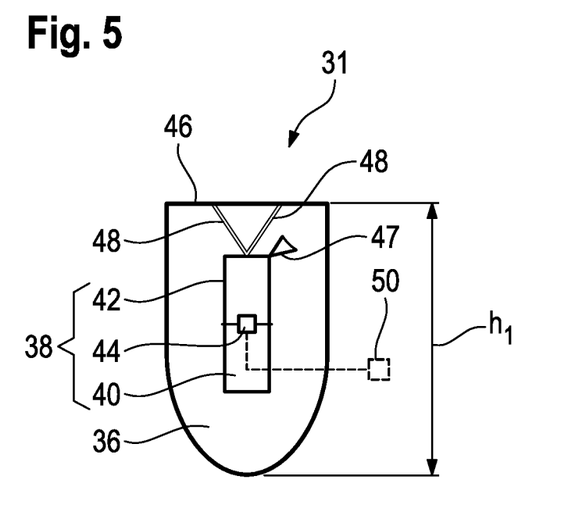
FIG. 5 shows one of the airbag modules from FIG. 3 with an airbag in a first inflated state.

The gas generator 40 serves for deploying the airbag 36 as soon as it receives a corresponding signal from the control unit 44.

Figure 6:
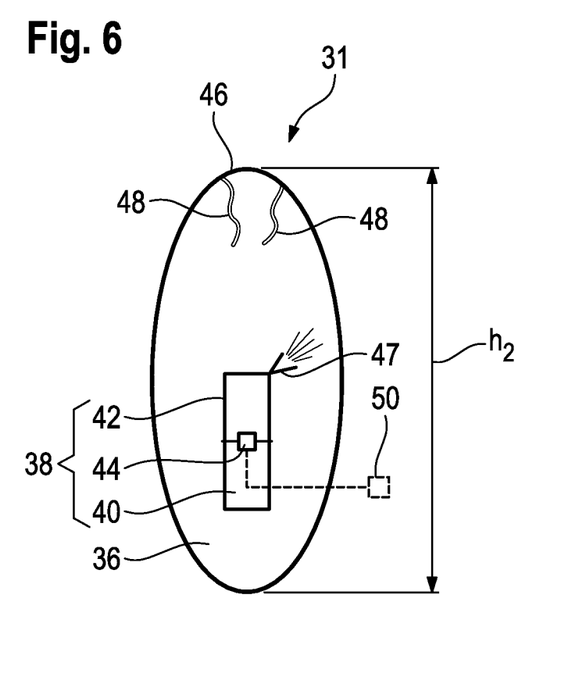
FIG. 6 shows the airbag module from FIG. 5 with the airbag in a second inflated state.

The airbag modules 31, 32, 33, 34 are adjustable in each case between a first state and a second state, wherein, in the first state, the corresponding airbag 36 adopts a first inflated state having a first external geometry in the case of restraint, and in the second state the corresponding airbag 36 adopts a second inflated state having a second external geometry in the case of restraint.

Basically, each airbag module 31, 32, 33, 34 may be designed individually.

However, it is advantageous when airbag modules 31, 32, 33, 34 mirror-inverted in pairs and having inverted states are provided on the seat 14 to ensure an identical protective effect in the first and second seating positions.

The airbag modules 31, 32, 33, 34 are further configured to adopt a state corresponding to the seating position of the seat 14 and, thus, the first inflated state and the second inflated state of the airbags 36 are coupled to the first seating position and the second seating position of the seat 14.

For this purpose, the seat 14 includes an orientation sensor 50 that is configured to detect the orientation of the seat 14 and, consequently, the seating position thereof.

The orientation sensor 50 is an angle of rotation sensor.

In an alternative embodiment, the seating position of the seat 14 can be detected by any sensor, such as by an optical sensor which is part of a camera system for monitoring the vehicle interior 12.

The control unit 44 is connected to the gas generator 40 and the release device 42 as well as to an orientation sensor 50 for data exchange.

The airbag modules 31, 32, 33, 34 are integrated in the seat 14, hence they are seat-integrated airbag modules 31, 32, 33, 34 or so-called side airbag modules.

More precisely, the airbag modules 31, 32, 33, 34 and, thus, also the corresponding airbags 36 are integrated in the lateral regions 52, 53 (see FIG. 3) of the backrest 24 each of which forms a side bolster of the backrest 24. Therefore, the airbags 36 are seat-integrated side airbags.

In an alternative embodiment, the airbags 36 are integrated, as least in portions, in particular completely, in the backrest 24, in particular in the lateral regions 52, 53.

The first airbag module 31 and the third airbag module 33 are jointly integrated in the left lateral region 52, while the second airbag module 32 and the fourth airbag module 34 are jointly integrated in the oppositely arranged right lateral region 53.

Figure 4:
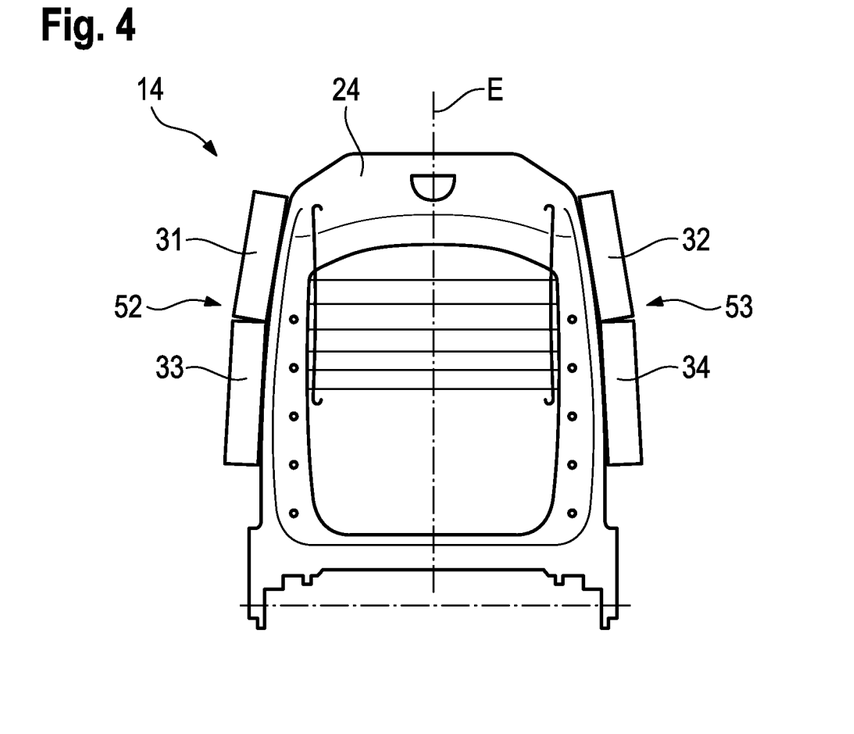

As shown in FIG. 4 illustrating a rear view of the backrest 24, the airbag modules 31, 32, 33, 34 are arranged symmetrically to a vertical plane E extending in the orientation A of the seat 14 centrally across the backrest 24.

Accordingly, the first and second airbag modules 31, 32 as well as the third and fourth airbag modules 33, 34 are arranged mirror-symmetrically to the plane E at the same vertical height.

Furthermore, the airbag 36 of the first airbag module 31 and the airbag 36 of the second airbag module 32 are designed to be mirror-inverted so that they are formed, in the inflated states of the same height h, to be mirror-symmetrical to the plane E. In other words, the airbags 36 of the first and second airbag modules 31, 32 in the inflated states show mirror-inverted geometries with respect to the plane E.

In the same way, the airbag 36 of the third airbag module 33 and the airbag 36 of the fourth airbag module 34 are designed to be mirror-inverted so that the airbags 36 of the third and fourth airbag modules 33, 34 show, in the corresponding inflated states, mirror-inverted geometries with respect to the plane E.

In an alternative embodiment, the seat may have any number of airbag modules 31, 32, 33, 34 which are preferably divided to both lateral regions 52, 53 and/or are provided in pairs, particularly symmetrically to the plane E.

Accordingly, any number of the airbag modules 31, 32, 33, 34, but at least one airbag module 31, 32, 33, 34, may include an airbag 36 with a first inflated state and a second inflated state. I.e., the occupant restraint system 30 may additionally comprise airbag modules and/or airbags which have only one single state in the case of restraint.

The basic functioning of the airbag modules 31, 32, 33, 34 will be exemplified in the following in FIGS. 5 and 6 by means of the airbag module 31. In both Figures, the airbag module 31 is shown in the activated state in the case of restraint, i.e., with a completely inflated airbag 36, in two different situations.

FIG. 5 shows the first inflated state and FIG. 6 shows the second inflated state of the airbag 36 of the airbag module 31.

The airbag 36 includes a wall 46 and at least one tether 48, and in the shown embodiment two tethers 48.

The tethers 48 are permanently anchored with their front ends to different points of the wall 46 and, with their rear ends, the tethers 48 are connected to the release device 42.

Release devices 42 for tethers 48 are known and can safely fix or release the tethers 48 when the airbag 36 is deployed so that the tether 48 is detached from the release device 42.

An outlet valve 47 is simultaneously coupled to the release device 42 for the respective tether 48. Said outlet valve 47 is closed when the tethers 48 are not released and is open, according to FIG. 6, when also the tethers 48 are released. An increased service life is imparted to the respective airbag by closing the outlet valve 47.

In general, it is of advantage when the airbag or airbags has/have a longer service life, if they are positioned close to the vehicle center, which in turn depends on the orientation of the seat.

Thus, the airbag 36 can adopt a first completely inflated state and a second completely inflated state, depending on whether the release device 42 has released the tethers 48 or keeps them fixed.

The inflated state is the state after activation of the airbag 36 in which the airbag 36 has reached its maximum possible volume for said inflated state.

FIG. 5 reveals that the tethers 48 are connected both to the wall 46 and to the release device 42 so that the airbag 36 in the first inflated state has a height h1.

In FIG. 6, the airbag 36 is shown in the second inflated state in which the tethers 48 were released by the release device 42 during inflation. It is also possible that the tethers 48 are no longer connected to each other.

Hence, the wall 46 is no longer fixed vis-à-vis the release device 42 so that the wall 46 can move further as compared to the first inflated position. In the second inflated state, the airbag 36 thus has a height h2 that is larger than the height h1 of the first inflated state.

Moreover, the volume of the airbag 36 in the second inflated state is larger than it is in the first inflated state. Thus, the airbag 36 provides different, viz. first and second, protective effects.

As a matter of course, the airbag 36 may differ in the first inflated state and in the second inflated state by other characteristics, for example by otherwise different geometries which not only comprise a different height or different orientations relative to the seat 14 and, resp., the backrest 24.

In general, the airbag 36 of each airbag module 31, 32, 33, 34 can have separate first and second inflated states, i.e., not all airbag modules 31, 32, 33, 34 must have an airbag 36 with identical first and second inflated states.

It has to be emphasized that the representations of the airbags in FIGS. 5 and 6 are purely symbolical to realize the different volumes and different internal pressures. Each of the airbags 31 and 32 are combined shoulder and head airbags, whereas the airbags 33 and 34 are thorax and pelvis airbags and in this case again are combined airbags. This means that their geometries are different from those of the combined shoulder-head airbag 31, 32. However, the basic options to realize said airbags with different internal pressures and external geometries depending on whether they are in the first or second state are the same.

In the present embodiment, the first and second airbag modules 31, 32 may have the same inflated states, but these states are provided to be inverted. That is to say, in a particular seat orientation the airbag 31 deploys in the first inflated state into the geometry shown in FIG. 5, whereas the airbag 36 of the second airbag module 32 deploys into the second state shown in FIG. 6.

Equally, the third and fourth airbag modules 33, 34 have the same inflated states which are also adopted in an inverted manner.

In the present embodiment, the first and third airbag modules 31, 33 as well as the second and fourth airbag modules 32, 34 are designed to be identical or at least mirror-inverted to the vertical longitudinal central axis of the seat so that the respective airbags 36 each have equal first and second inflated states.

In this way, as will be illustrated further below, airbag modules 31, 32, 33, 34 arranged in pairs can help ensure identical protective effects to be provided by the airbag modules 31, 32, 33, 34 both in the first seating position and in the second seating position.

In the first seating position (see FIG. 1) in which the seat 14 is oriented in the direction of travel F, the left lateral region 52 with the first and third airbag modules 31, 33 is arranged adjacent to the sidewall 54 of the vehicle 10 abutting on the seat 14, while the right lateral region 53 with the second and fourth airbag modules 32, 34 is arranged adjacent to the central tunnel 56 that is provided between the seat 14 and the passenger seat 16 in the vehicle interior 12.

In the second seating position (see FIG. 2) in which the seat 14 is oriented against the direction of travel F, the left sidewall 52 with the first and third airbag modules 31, 33 is arranged adjacent to the central tunnel 56, while the right lateral region 53 with the second and fourth airbag modules 32, 34 is arranged adjacent to the sidewall 54.

The protective effect provided by the airbag modules 31, 32, 33, 34 in the case of restraint thus depends, apart from the state in which the corresponding airbag module 31, 32, 33, 34 is, on whether the airbag module 31, 32, 33, 34 is arranged adjacent to the sidewall 54 or adjacent to the central tunnel 56.

In order to provide identical protective effects by the airbag modules 31, 32, 33, 34 both in the first seating position and in the second seating position, the occupant restraint system 30 is configured as follows by means of the airbag control devices 38 of the airbag modules 31, 32, 33, 34.

In the first seating position, the airbag modules 31, 33 are in a first state so that, in the case of restraint, the airbags 36 adopt their respective first inflated state and deploy in a respective protecting direction. The airbags 36 of the first and third airbag modules 31, 33 are thus inflated into the state of the height h1 shown in FIG. 5, while the airbags 36 of the second and fourth airbag modules 32, 34 are inflated into the state of the height h2 shown in FIG. 6 and thus adopt the second state.

As already emphasized, the FIGS. 4 and 5 are symbolic of the airbags 36, i.e., the airbags of the first and second airbag modules may differ from those of the third and fourth airbag modules. Also, the first states need not always be the states with a smaller volume. Rather, the first states of the third and fourth airbag modules 33, 34 could also have, in their first state, the smaller volume as compared to the second state.

Accordingly, the (first) airbag 36 of the first airbag module 31 provides a first protective effect, the (second) airbag 36 of the second airbag module 32 provides a second protective effect, the (third) airbag 36 of the third airbag module 33 provides a third protective effect, and the (fourth) airbag 36 of the fourth airbag module 34 provides a fourth protective effect.

In the second seating position, the airbags 36 of the airbag modules 31, 33 are in such a state that, in the case of restraint, the airbags 36 adopt their second inflated state. The airbags 36 of the first and third airbag modules 31, 33 are thus inflated into the state of the height h2 as shown in FIG. 6, whereas the airbags 36 of the second and fourth airbag modules 32, 34 are inflated into the state of the height h1 shown in FIG. 5 and thus adopt the first state.

Due to the mirror-inverted design of the first and second airbag modules 31, 32, the airbag 36 of the first airbag module 31 provides a protective effect corresponding to the second protective effect of the airbag 36 of the second airbag module 32 in the first seating position, and the airbag 36 of the second airbag module 32 provides a protective effect corresponding to the first protective effect of the airbag 36 of the first airbag module 31 in the first seating position.

Further, due to the mirror-inverted design of the third and fourth airbag modules 33, 34, the airbag 36 of the third airbag module 33 provides a protective effect corresponding to the fourth protective effect of the airbag 36 of the fourth airbag module 34 in the first seating position, and the airbag 36 of the fourth airbag module 34 provides a protective effect corresponding to the third protective effect of the airbag 36 of the third airbag module 33 in the first seating position.

As the first and third airbag modules 31, 33 in the left lateral region 52 are configured to be mirror-inverted to the second and fourth airbag modules 32, 34 in the right lateral region 53, the airbag modules 31, 32, 33, 34 of one lateral region 52, 53 can take over the corresponding function of the airbag modules 31, 32, 33, 34 of the other lateral region 52, 53 in the first and second seating positions.

In this way, the occupant restraint system 30 can provide the same protective effect in both seating positions, thereby improving the safety for the vehicle occupant sitting in the seat 14.

In order to further increase the protective effect of the occupant restraint system 30, the airbag modules 31, 32, 33, 34 can be released in response to the load case occurring in the event of crash with inflated states of the airbags 36 adapted to the load case. For example, the occupant restraint system 30 may be configured differently for a near-side load case than for a far-side load case.

For this purpose, the occupant restraint system 30 is connected to the board computer of the vehicle 10, for example, in a signal-transmitting manner, the board computer detecting the corresponding data on the load case by means of a sensor system provided for this purpose and making them available to the occupant restraint system 30.

For example, the occupant restraint system 30 is configured in one embodiment in accordance with the Tables 1 and 2, Table 1 defining the configuration in the first seating position (see FIG. 1) and Table 2 defining the configuration in the second seating position (see FIG. 2).

TABLE 1

Configuration of the occupant restraint system 30 in the first seating position

| airbag module (GM) | third GM 33 | first GM 31 | second GM 32 | fourth GM 34 |
|---|---|---|---|---|
| protective effect/module designation | SAB | shoulder pusher | far-side | |
| outlet valve 47 | open | open | closed | closed |
| tethers 48 | released | released | not released | not released |
| area of protection | thorax/pelvis | shoulder/head | shoulder/head & thorax/pelvis | |

TABLE 2

Configuration of the occupant restraint system 30 in the second seating position

| airbag module (GM) | third GM 33 | first GM 31 | second GM 32 | fourth GM 34 |
|---|---|---|---|---|
| protective effect/module designation | far-side | | shoulder pusher | SAB |
| outlet valve 47 | closed | closed | open | open |
| tethers 48 | not released | not released | released | released |
| area of protection | thorax/pelvis & shoulder/head | | shoulder/head | thorax/pelvis |

In the first seating position, the first airbag module 31 forms a shoulder pusher module, the third airbag module 33 forms a side airbag module (SAB module) and the second and fourth airbag modules 32, 34 jointly form a far-side module.

Accordingly, the second airbag module 32 covers the shoulder and head area and the fourth airbag module 34 covers the thorax and pelvis area.

Upon release in the first seating position, in the case of a "near-side" load case the third airbag module 33 and the first airbag module 31 are ignited. For the third airbag module 33 the outlet valve 47 is opened. Furthermore, the tethers 48 are released so that the first airbag module 31 deploys into the second inflated state and reliably provides the protection in the head and shoulder area required for this load case.

Upon release in the first seating position, in the case of a "far-side" load case the outlet opening 47 in each of the second and fourth airbag modules 32, 34 is closed so that the second and fourth airbag modules 32, 34 meet the requirement of service life. Further, the tethers 48 are not released in this load case, thereby the second and fourth airbag modules 32, 34 jointly covering and thus protecting reliably the pelvis and thorax area as well as the shoulder and head area.

When the seat 14 is in the second seating position, the following inverted situation results from the identical module designs in the left and right lateral regions 52, 53 of the seat 14.

In the second seating position, the second airbag module 32 forms the shoulder pusher module, the fourth airbag module 34 forms the side airbag module (SAB module), and the first and third airbag modules 31, 33 jointly form the far-side module.

Accordingly, the first airbag module 31 covers the shoulder and head area and the third airbag module 33 covers the thorax and pelvis area.

In the event of a "near-side" load case, the outlet valve 47 of the fourth airbag module 34 is opened and the tethers 48 of the second airbag module 32 are released so that the second airbag module 32 reliably provides the protection in the head and shoulder area required for this load case.

In the event of a "far-side" load case, each of the outlet openings 47 in the first and third airbag modules 31, 33 is closed so that they meet the requirement of service life and do not release the tethers 48.

The invention is not restricted to the shown embodiment. In particular, individual features of one embodiment can be combined with any features of other embodiments, especially independently of the other features of the respective embodiments.

The invention claimed is:

1. An occupant restraint system comprising a seat, at least one airbag integrated in the seat and an airbag control device,
   wherein the seat is adjustable at least between a first seating position and a second seating position and in the second seating position has an orientation that is rotated in relation to the first seating position about an angle of rotation from 170° to 190°,
   wherein the airbag has a first inflated state having a first external geometry and a second inflated state having a second external geometry, different than the first external geometry, and
   wherein the airbag control device is configured to cause the airbag to adopt the first inflated state when the seat is in the first seating position and to adopt the second inflated state when the seat is in the second seating position.

2. The occupant restraint system according to claim 1, wherein the seat in the second seating position has an orientation that is rotated in relation to the first seating position about an angle of rotation of 180°.

3. The occupant restraint system according to claim 1, wherein the airbag is a seat-integrated side airbag.

4. The occupant restraint system according to claim 1, wherein the seat comprises a second airbag, wherein the second airbag has a first inflated state having a first external geometry and a second inflated state having a second external geometry, different than the first external geometry, and wherein the airbag control device is configured to cause the second airbag to adopt the second inflated state when the seat is in the first seating position and to adopt the first inflated state when the seat is in the second seating position.

5. The occupant restraint system according to claim 4, wherein the first airbag and the second airbag are seat-integrated side airbags provided on lateral regions of the seat opposite to each other.

6. The occupant restraint system according to claim 5, wherein the first and second airbags in the first inflated state and in the second inflated state are formed symmetrically to a vertical plane extending centrally relative to the associated seat.

7. The occupant restraint system according to claim 4, wherein the seat comprises a third airbag and a fourth airbag, each of the third airbag and the fourth airbag having a first inflated state with a first external geometry and a second inflated state with a second external geometry, different than the first external geometry, wherein the airbag control device is configured to cause the third airbag to adopt the first inflated state and the fourth airbag to adopt the second inflated state when the seat is in the first seating position, and wherein the airbag control device is configured to cause the third airbag to adopt the second inflated state and the fourth airbag to adopt the first inflated state when the seat is in the second seating position.

8. The occupant restraint system according to claim 7, wherein the third airbag and the fourth airbag are seat-integrated side airbags, the first airbag and the third airbag being provided on a first lateral region of the seat and the second airbag and the fourth airbag being provided on a second lateral region of the seat opposite to the first lateral region.

9. The occupant restraint system according to claim 8, wherein the third and fourth airbags in the first inflated state and in the second inflated state are formed symmetrically to a vertical plane extending centrally relative to the associated seat.

10. The occupant restraint system according to claim 4, wherein the airbag control device includes a release device associated with each airbag, wherein each release device is configured to release its corresponding airbag to the second inflated state.

11. The occupant restraint system according to claim 10, further comprising at least one tether associated with each release device, wherein, in the first inflated state of each airbag, the release device associated with the airbag maintains a connection with the at least one tether associated with the airbag, and wherein, in the second inflated state of each airbag, the release device associated with the airbag releases the connection with the at least one tether associated with the airbag, wherein each of the release devices is arranged to selectively release the tether of the corresponding airbag in response to the airbag control device.

12. The occupant restraint system according to claim 1, wherein each airbag is coupled to a driven outlet valve through which the internal pressure of the airbag is adjustable.

13. The occupant restraint system according to claim 12, wherein the airbags are configured so that, when they are close to a vehicle sidewall, the outlet valve is open, and when they are close to the vehicle center, the outlet valve is closed.

14. The occupant restraint system according to claim 1, wherein the seat includes an orientation sensor which is connected to the airbag control device for signal transmission and which is arranged to determine the orientation of the seat.

15. A vehicle comprising an occupant restraint system according to claim 1.

16. The occupant restraint system according to claim 4, wherein the first airbag and the second airbag are seat-integrated combined head-shoulder airbags or combined thorax-pelvis airbags provided on lateral regions of the seat opposite to each other.

17. The occupant restraint system according to claim 8, wherein the first airbag and the second airbag are head-shoulder airbags and the third and fourth airbags are combined thorax and pelvis airbags.

18. The occupant restraint system according to claim 8, wherein the first and second airbags are combined thorax and pelvis airbags, the third and fourth airbags are combined head-shoulder airbags.

* * * * *